April 28, 1931.                D. McNEIL                    1,802,824
                    COMBINED GAINING AND BORING MACHINE
                    Filed April 22, 1929     4 Sheets-Sheet 1

Inventor:
Duncan McNeil
by [signature]
Atty.

April 28, 1931.   D. McNEIL   1,802,824
COMBINED GAINING AND BORING MACHINE
Filed April 22, 1929   4 Sheets-Sheet 2
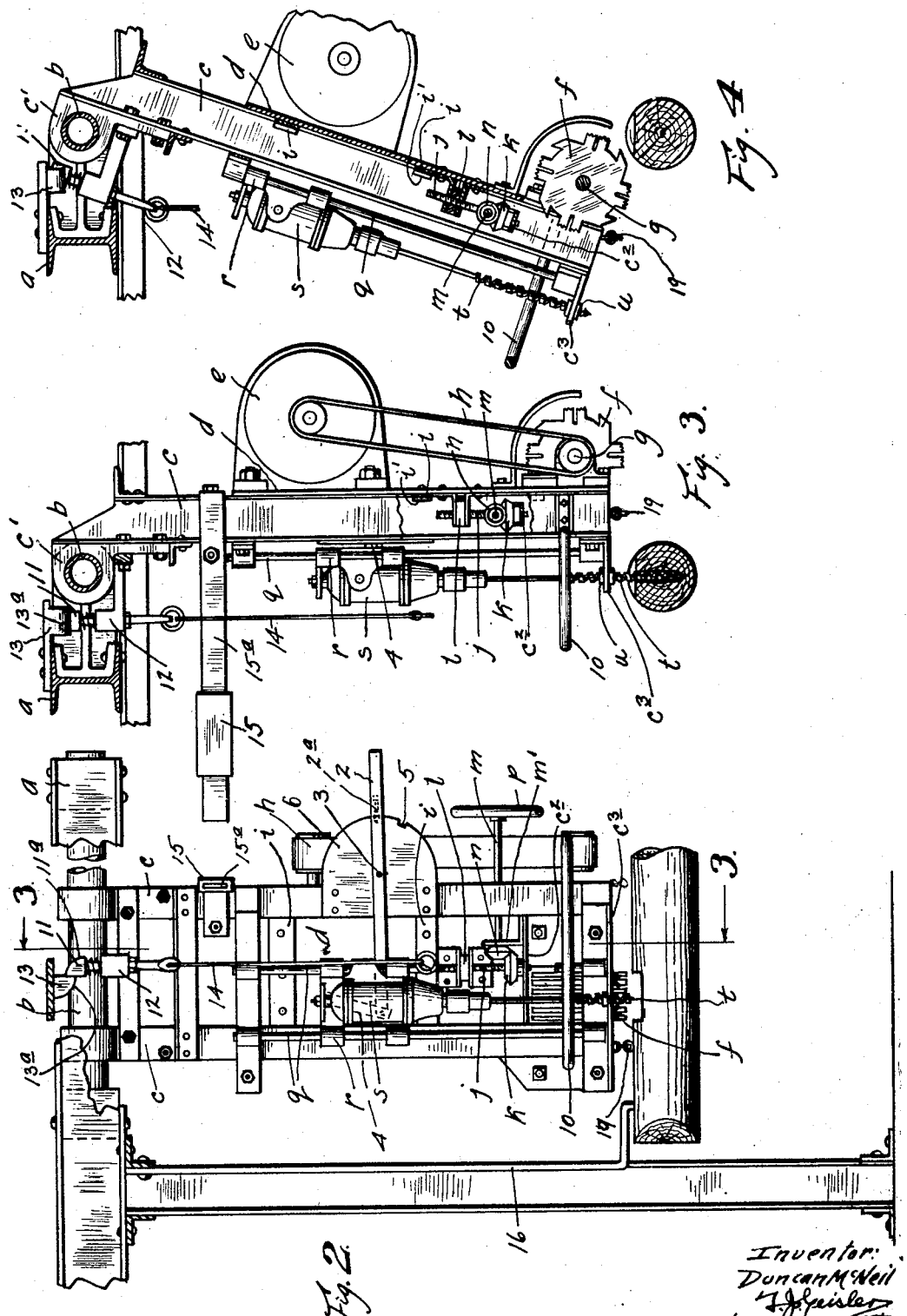

April 28, 1931. D. McNEIL 1,802,824
COMBINED GAINING AND BORING MACHINE
Filed April 22, 1929 4 Sheets-Sheet 3
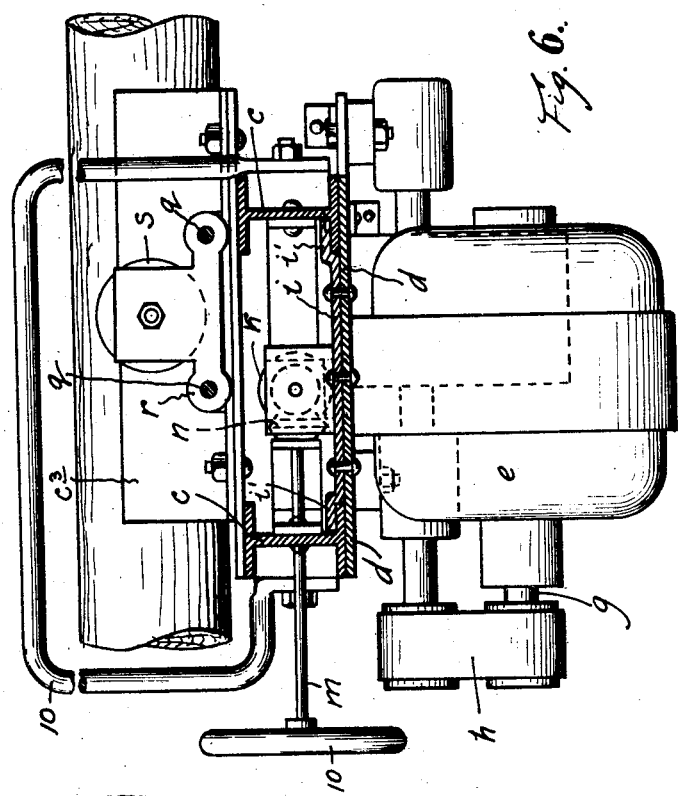
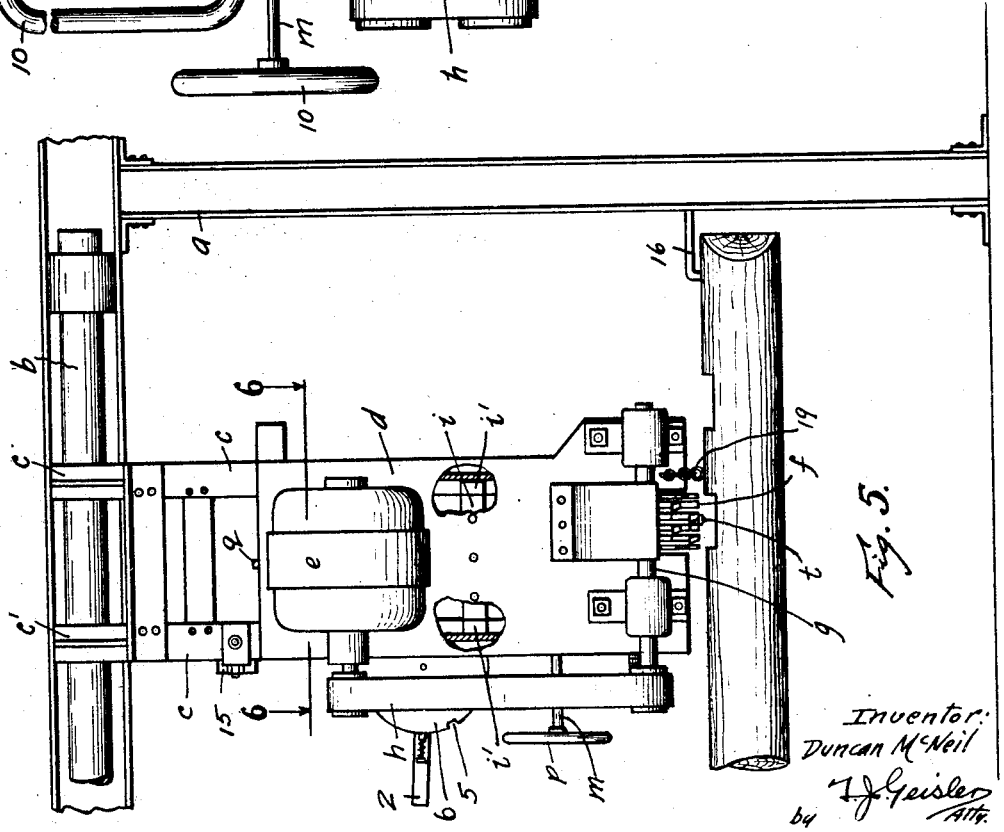
Inventor:
Duncan McNeil
by J. J. Geisler
Atty.

April 28, 1931.  D. McNEIL  1,802,824
COMBINED GAINING AND BORING MACHINE
Filed April 22, 1929   4 Sheets-Sheet 4
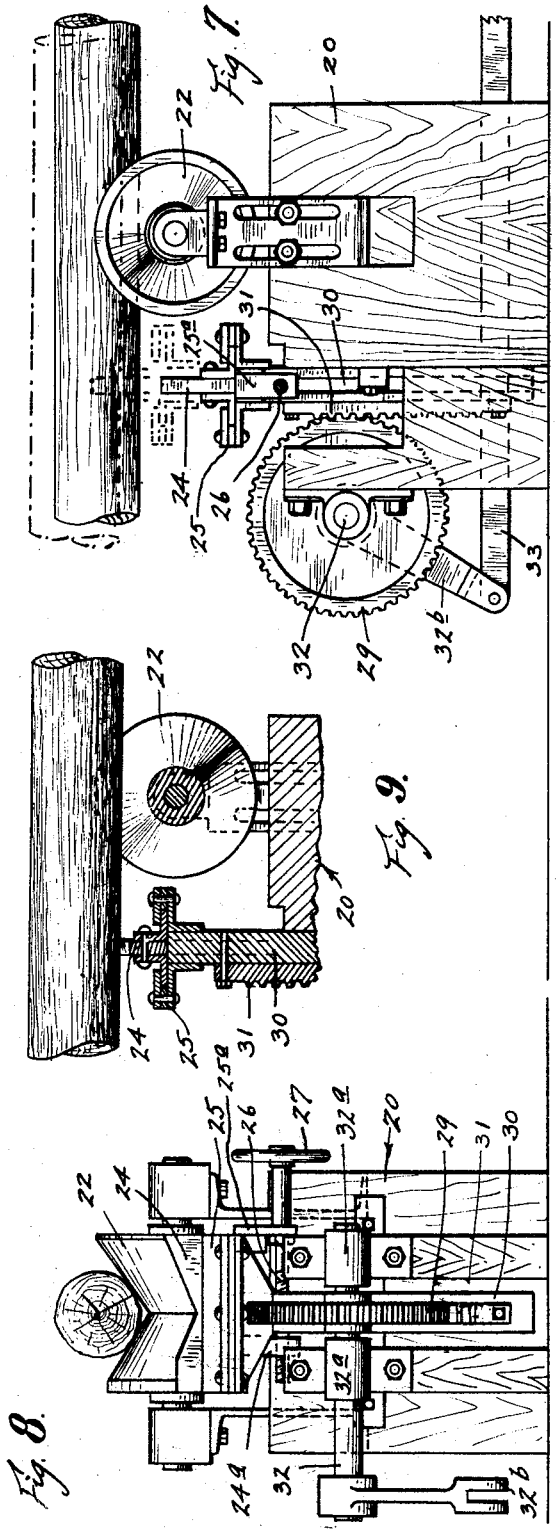
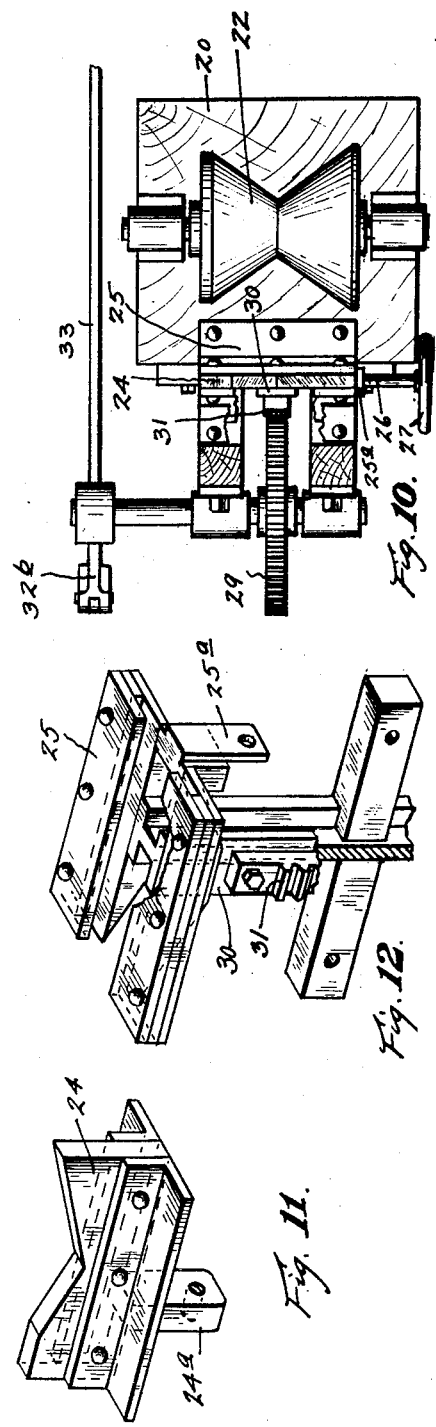
Inventor:
Duncan McNeil Patented Apr. 28, 1931

1,802,824

UNITED STATES PATENT OFFICE

DUNCAN McNEIL, OF ST. HELENS, OREGON

COMBINED GAINING AND BORING MACHINE   REISSUED

Application filed April 22, 1929. Serial No. 357,093.

The object of my invention is to provide efficient means for cutting and boring the "gains", or grooves of telephone and telegraph poles, and the like, in which to insert the arm or cross-piece.

In order to attain uniformly and symmetry of the line the cross-arms must be arranged horizontally irrespective of any deformation or "bow" of the pole. Furthermore, in order that the poles may be alined correctly the curve of the bow must be arranged in the vertical plane of the line in which the poles are set up. Also the roof is cut so that the axis of the dihedral is transverse of the gain, but coincident with the line of the poles.

By my invention I provide a machine adapted to cut and bore the gains of the poles uniformly and quickly in the mill so that the poles when taken out into the field are ready to have said "cross-trees" bolted to them and the poles set up without delay, and so as to be properly positioned for presenting a uniform and symmetrical appearance.

Another object of my invention is to provide a machine adapted to cut and bore the gains of the poles with a minimum of work, thereby to prepare each pole at a minimum of cost and without waste such as would be occasioned by the spoiling of any of the poles, since a pole with a gain improperly cut must be thrown aside for it would be refused by the power company for whom it was prepared.

A further object is to provide means for rapidly and properly positioning the poles to be bored and cut.

I attain these objects in a combined gaining and boring machine comprising, in combination means adapted to support the work in horizontal position, a horizontally movable frame adapted for arcuate movement transversely of the axis of the work, means adapted normally to hold the frame spaced from one side of the work, a carriage mounted on said frame movable in a plane coinciding with said axis, means for positioning and securing the carriage in place, an arbor journaled in said frame parallel with said plane, cutters mounted on said arbor, a motor carried by the frame for driving said arbor, a motor-driven vertically movable boring-device on said frame, means for positioning and securing said boring-device in place, and a gauge carried by the lower end of the frame whereby to gauge the depth of the gain.

In connection with my invention herein described I prefer to use the machine for roofing telegraph poles which is described in my pending application entitled Roofing machine, Serial No. 318,002, filed November 8, 1928.

The specific features, the details of construction, and the mode of operation of my machine are hereinafter fully described with reference to the accompanying drawings.

In the drawings:

Fig. 2 shows an elevation of my gaining and boring machine and illustrates the relative arrangement of the machine and the pole;

Fig. 3 shows a section taken on the line 3—3 of Fig. 2, and illustrates my machine in position after the "gain" has been cut, but before being bored;

Fig. 4 shows similarly a side elevation of my machine and illustrates the position of the machine after the gain has been cut;

Fig. 5 shows a view of the boring machine taken from the opposite side to that shown in Fig. 2;

Fig. 6 shows a section taken on the line 6—6 of Fig. 5;

Figs. 7, 8 and 9 show the details of construction of the means provided for positioning the pole; and Figs. 10, 11 and 12 illustrate further details of construction of the positioning means.

Figure 1:
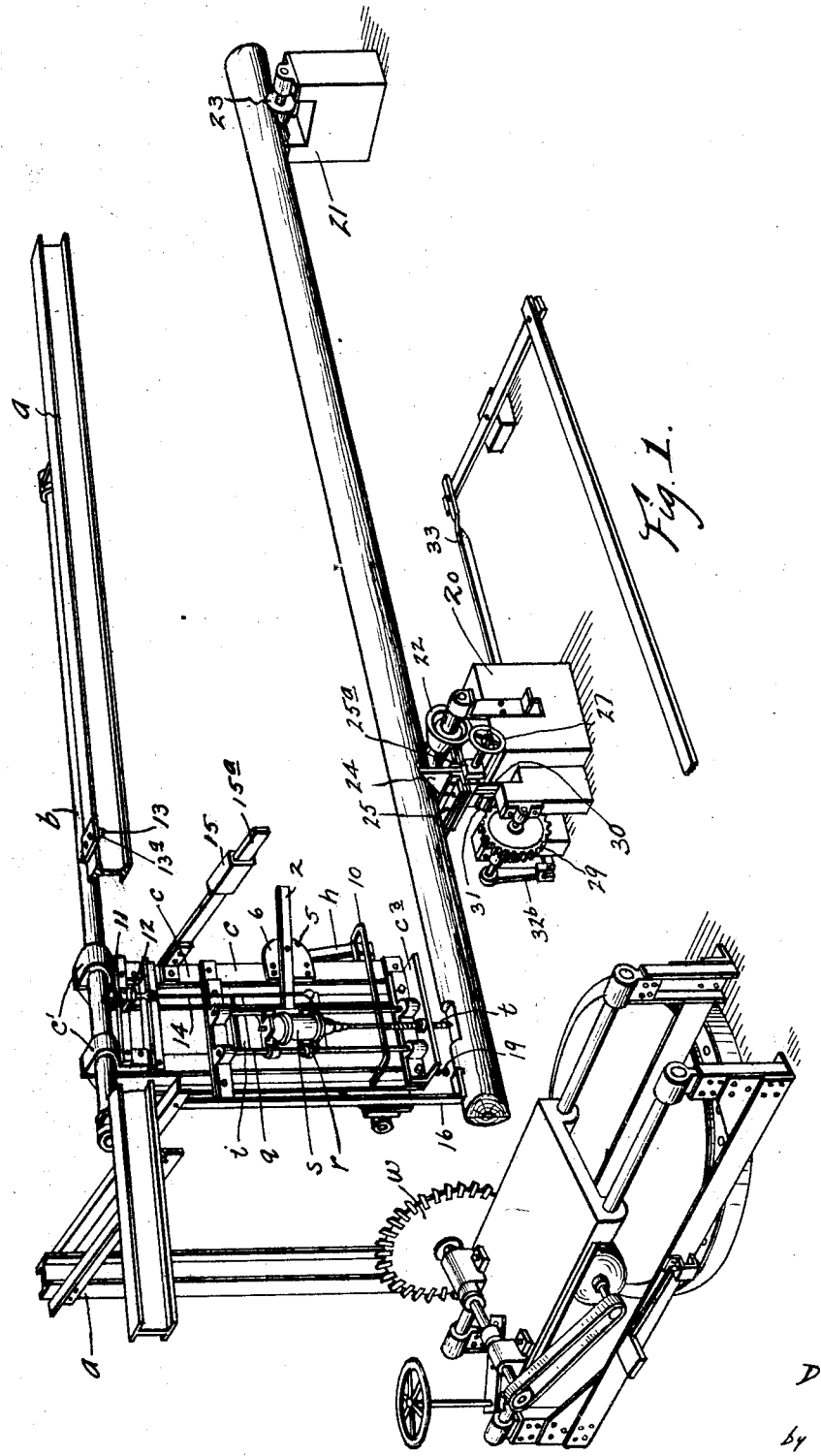
Fig. 1 shows a perspective view of my combined gaining and boring machine and illustrates a pole in position to be cut and bored.

Referring to Figs. 1 to 7 my invention comprises a superstructure $a$ carrying a horizontal shaft $b$ on which a frame $c$ is suspended as at $c'$ for longitudinal movement and for movement in a limited transverse arc.

To the rear side of the frame $c$ is secured a plate $d$, carrying an electric motor $e$ on its upper portion and on its lower portion a series of saws $f$ preferably of the "dado" type mounted on an arbor $g$ journaled on the said plate, the saws $f$ being driven by the motor $e$ by means of a belt $h$.

The plate $d$ is adapted for vertical movement on the frame $c$ by means of transverse bars $i$ riveted to the plate $d$ on the side adjacent the frame and provided on each end with offset portions $i'$ forming a slot in which the adjacent portions of the angles forming the sides of the frame $c$ are arranged.

The means provided for moving the plate $d$ vertically comprise an elevating screw $j$ provided on its lower end with a bevel gear $k$ journaled in the lower transverse member $c2$ of the frame $c$ and threaded at its upper end into a nut $l$ carried by the plate $d$, and a horizontal shaft $m$ journaled in the frame $c$ as at $m'$ which is provided on one end with a bevel gear $n$ in mesh with the gear $k$ and on the other with a hand operating wheel $p$.

To the other side of the frame $c$ from the plate $d$ are fixed vertical, parallel bars $q$ on which is mounted for movement thereon a bracket $r$ carrying a motor $s$ to the shaft of which is fixed a wood boring bit $t$ extending downward through a guide hole $u$ in the lower transverse member $c3$ of the frame.

A lever 2 is pivoted on the frame as at 3 and connected by a link 4 to the bracket $r$ so that the bit $t$ may be lifted from the work, and a lug $2a$ provided on the said lever 2 is engageable in a notch 5 formed in a segmental section 6 carried by the frame $c$ to normally hold the bit uplifted and out of engagement with the work, its own weight carrying it downward, when the lever 2 is released.

A U-shaped handle 10 is provided on the frame $c$ near its lower end for convenience in swinging the frame through its arc.

A spring seated latch 11 is carried in a bracket 12 affixed to the frame $c$ near the top and adajacent the superstructure $a$, which is adapted to engage with a series of stops 13 carried by the said superstructure. The latch 11 is rounded on one side face $11a$ and the stops 13 are rounded on the opposite side faces $13a$ to permit the frame $c$ to be moved along the shaft $b$ without interference in one direction, but to act as a stop to movement in the other direction, until the latch 11 is disengaged by pulling the lanyard 14. The stops 13 are adapted to be arranged on the superstructure $a$ for the various positions of the frame $c$.

A counter weight 15 is provided carried by the frame $c$ on a bar $15a$, for normally holding the frame in a vertical position as shown in Fig. 3.

A depending guide rod 16 is suspended from the superstructure $a$ and adapted to serve as a guide for positioning the poles.

I also provide a depth guide 19 comprising a flexible element preferably a short section of chain suspended from the lower edge of the plate $d$ in such a position and of such length that its end will just sweep the pole positioned under it as the frame is swung forward to indicate that the saws $f$ are properly set to cut the full depth of their adjustment.

In order to hold the pole properly positioned so that the gain will be cut horizontally and transverse of the longitudinal axis of the pole, I provide supports 20 and 21 so alined as to bring the pole into position perpendicular to the cut of the saws $f$ and the bit $t$, see Figs. 7 to 12.

The supports 20 and 21 are provided with rollers 22 and 23, but the support 20 is also provided with means for raising or lowering the pole and for moving it to one side or the other so that the required position of the pole under the machine may be conveniently attained.

The roller 22 carried by the block 20 is relatively immovable, but a member 24 provided with a V-shaped notch is arranged adjacent the roller which is adapted for lateral movement in a frame 25, by means of a screw 26, threaded in a depending section $24a$ of the member 24, and journaled on the frame 25 in a depending section $25a$. The screw 26 is provided on its other end with an operating hand wheel 27.

The frame 25 is adjustable vertically by means of a downwardly extending portion 30 provided with a rack bar 31 in which a gear wheel 29 meshes. The gear wheel 29 is mounted on a shaft 32 journaled as at $32a$ on the support 20, and provided on its end with a crank lever $32b$ connected with suitable operating means 33, only partly shown in Figs. 1 and 12.

The operation of my boring and gaining machine is as follows:

The work holding or supporting means are arranged in position to receive a pole, that is, the section 24 on the support 20 is lowered to permit the pole to be rolled longitudinally on the rollers 22 and 23 until it is under the frame $c$, and the smaller end is adjacent the saw $w$ of the roofing machine and the guide rod 16.

To position the pole vertically and laterally the plate 25 is raised by means of the levers 33 and adjusted laterally by means of the hand wheel 27 until the end of the pole bears against the guide rod 16, and thus the pole will be ready to be gained and bored.

By these means and by rotating the pole about its longitudinal axis the pole is conveniently positioned so that any bow or curve from its longitudinal axis will be arranged in planes perpendicular to the cut of the saws $f$ and the gains will be cut transverse of the said bow or curve.

The pole being properly positioned and the saws $f$ and bit $t$ in operation, the operator grasps the handle 10 and pulls the frame c towards him, which brings the saws f in contact with the pole to cut the transverse groove or gain. The handle is then released and the frame swings back to its vertical position due to the counter weight 15, and the lever 2 is released from the notch 5, so that the wood boring bit which is normally in correct alinement descends on the pole in the center of the gain and bores the hole through it for the bolt of the cross-arm after which the operator lifts the bit t and engages the lever 2 with the segmental plate 6.

Thus when the cross-arm is bolted in the gains so cut, they will be transverse of any longitudinal deformation of the pole, and the pole when set in line in the field will present a symmetrical appearance with the rest of the poles, all the cross arms being the same relative distance from the top of the pole and the poles being individually positioned so that when looking down the line they will appear to be straight and perpendicular to the ground, and the cross-arms in horizontal planes.

If more than one gain is to be cut in the pole, the operator slides the frame c on the shaft b, until the latch 11 has passed over the stop 14 and bears against the opposite side of it so that the frame c is then positioned for cutting the next gain, and the operation is ready to be repeated, as illustrated in Fig. 6.

To move the frame c back to its first position the operator grasps the lanyard 14 to disengage the latch 11 from the stop 14.

I claim:

1. A combined gaining and boring machine comprising a frame supported for bodily swinging and sliding movement, a plate slidably mounted with respect to the frame, a cutting element carried by the plate, a motor for operating the element carried by the plate, means whereby the plate may be adjusted and fixed in any adjusted position with respect to the frame, a boring tool mounted for reciprocation vertically of the frame, a motor for the tool movable therewith, and manually operable means whereby the boring tool and motor therefor may be moved to an inoperative position and held in such position.

2. A combined gaining and boring machine comprising a frame mounted for swinging and sliding movement and including spaced parallel bars, a plate supported for sliding movement with respect to said bars, a cutter carried by the plate, a motor for operating the cutter carried by the plate, means arranged between the bars of the frame for adjusting the plate longitudinally of the frame and fixing said plate in adjusted position, guide bars carried by the frame, a power driven tool slidably mounted on the guide bars, and a manually operable lever for moving the power driven tool to an inoperative position.

3. A combined gaining and boring machine comprising a support, a frame mounted for swinging and sliding movement relative to said support, independent tools carried by the frame, independent means for adjusting said tools with respect to the frame, and manually controlled means whereby the frame may be locked in varying predetermined positions in its sliding relation to the support.

4. A combined gaining and boring machine comprising a support, a frame mounted for swinging and sliding movement relative to said support, independent tools carried by the frame, independent means for adjusting said tools with respect to the frame, stops on the support, and a manually operated stop on the frame to cooperate with the support carried stops to determine the sliding position of the frame with respect to the support.

5. A combined gaining and boring machine comprising a support, a frame mounted for swinging and sliding movement relative to said support, independent tools carried by the frame, independent means for adjusting said tools with respect to the frame, stops on the support, and a manually operated stop on the frame to cooperate with the support carried stops to determine the sliding position of the frame with respect to the support, said stops cooperating in all operative swinging positions of the frame.

6. A combined gaining and boring machine including a support, a frame mounted for sliding and swinging movement with respect to the support and including spaced bars, a plate slidable on one face of the bars, a cutter carried by the plate, a motor for operating the cutter carried by the plate, a threaded rod arranged intermediate the bars for vertically adjusting the plate with respect to the bars, means operative from beyond the bars for actuating said rod in either direction, guide rods carried by the bars on the side opposite the plate, a power driven boring tool slidable on said rods and positioning itself during operation by gravity, and means for manually raising the boring tool to an inoperative position.

DUNCAN McNEIL.